US008675036B2

(12) United States Patent
Nishiguchi

(10) Patent No.: US 8,675,036 B2
(45) Date of Patent: Mar. 18, 2014

(54) DEFLECTION SCANNER

(75) Inventor: Tetsuya Nishiguchi, Tagata-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/592,732

(22) Filed: Aug. 23, 2012

(65) Prior Publication Data

US 2013/0050387 A1 Feb. 28, 2013

(30) Foreign Application Priority Data

Aug. 31, 2011 (JP) ................................. 2011-189536
Aug. 21, 2012 (JP) ................................. 2012-182406

(51) Int. Cl.
*B41J 2/385* (2006.01)
*B41J 15/14* (2006.01)
*B41J 27/00* (2006.01)
*G02B 26/08* (2006.01)

(52) U.S. Cl.
USPC ........... 347/259; 347/137; 347/243; 347/261; 359/204.3

(58) Field of Classification Search
None
See application file for complete search history.

(56) References Cited

U.S. PATENT DOCUMENTS

| 7,705,872 | B2 | 4/2010 | Higaki et al. |
| 7,880,760 | B2 | 2/2011 | Bannai et al. |
| 7,986,334 | B2 | 7/2011 | Bannai et al. |
| 2009/0058981 | A1* | 3/2009 | Higaki et al. ................. 347/243 |
| 2009/0066780 | A1 | 3/2009 | Bannai et al. |
| 2009/0220276 | A1 | 9/2009 | Bannai et al. |
| 2011/0216386 | A1* | 9/2011 | Watanabe et al. .......... 359/204.3 |

FOREIGN PATENT DOCUMENTS

| JP | 2009-063615 A | 3/2009 |
| JP | 2009-063739 A | 3/2009 |
| JP | 2009-069178 A | 4/2009 |
| JP | 2009-069399 A | 4/2009 |
| JP | 2009-205098 A | 9/2009 |
| JP | 2009-216882 A | 9/2009 |
| JP | 2010-026440 A | 2/2010 |
| JP | 2011-013322 A | 1/2011 |

* cited by examiner

*Primary Examiner* — Matthew Luu
*Assistant Examiner* — Kendrick Liu
(74) *Attorney, Agent, or Firm* — Fitzpatrick, Cella, Harper & Scinto

(57) ABSTRACT

An optical scanning apparatus has first and second light sources, a deflection scanning device, and first and second scanning optical systems that guide the first and second laser beams deflected for scanning by the deflection scanning device. The first and second scanning optical systems include scanning lenses and a polarization beam splitter arranged in a downstream side of an optical path of the scanning lens, the first scanning optical system including a half-wave plate arranged in the downstream side of the optical path of the scanning lens and in an upstream side of an optical path of the polarization beam splitter, the first laser beam and the second laser beam having different phases by 180 degrees from each other before being incident on the first and second scanning optical systems.

9 Claims, 6 Drawing Sheets

US 8,675,036 B2

DEFLECTION SCANNER

BACKGROUND OF THE INVENTION

1. Field of the Invention

The present invention relates to a deflection scanner used in an image forming apparatus.

2. Description of the Related Art

In recent years, an image forming apparatus such as a color printer has in many cases employed a tandem system of forming images of yellow, magenta, cyan and black in four photosensitive members, respectively, and forming a color image by sequentially stacking the images on an intermediate transfer member or a recording material. As for the image forming apparatus using the tandem system, the deflection scanner is known which is structured in the following way in order to miniaturize the main body and reduce the price. Specifically, the deflection scanner prepares a set of light-emitting points for generating a plurality of light beams having different wavelengths, on the same axis in a sub-scan direction, deflects the light beams emitted from each light source with a polygon mirror, respectively, and irradiates a scanning lens with the deflected light beam. Then, the deflection scanner separates the light beams which have passed through the scanning lens by using a dichroic mirror and a polarization beam splitter, and irradiates a plurality of photosensitive members (a plurality of surfaces to be scanned) with the split light beams, respectively. The deflection scanner which has an optical system having such a structure arranged symmetrically with respect to the polygon mirror of the center is described in Japanese Patent Application Laid-Open No. 2009-063739.

However, when the deflection scanner irradiates symmetrically both sides of the polygon mirror with the light beams, stray light which has been generated by the reflection of the light beam on a lens surface of the scanning lens of one optical system and the like passes through the side of the polygon mirror and may be incident on the optical system on the opposite side. In this case, if the stray light has reached an image surface (photosensitive member) of the optical system on the opposite side, the stray light causes an image failure. In order to prevent such passing of stray light, it has been considered to provide a light-shielding plate in the vicinity of the polygon mirror to prevent the light beam which has been generated in the one optical system from being incident on the other optical system. However, because the polygon mirror rotates at a high speed, if the light-shielding plate has been arranged in the proximity of the polygon mirror, wind noise results between the light-shielding plate and the polygon mirror, and accordingly it is necessary to place the light-shielding plate and the polygon mirror at some distance. Accordingly, a gap between the light-shielding plate and the polygon mirror cannot be completely bridged, and accordingly a part of reflected light results in passing between the light-shielding plate and the polygon mirror. Because of this, the image failure cannot be occasionally fully prevented.

SUMMARY OF THE INVENTION

A purpose of the present invention is to suppress the phenomenon of a surface to be scanned which is irradiated with one optical system being irradiated with stray light which has been generated in the optical system arranged on the opposite side with respect to a polygon mirror.

Another purpose of the present invention is to provide an optical scanning apparatus including: first and second light sources which emit first and second laser beams, respectively; a deflection scanning device for deflecting the first and second laser beams for scanning; and first and second scanning optical systems which are arranged so as to face each other with the deflection scanning device therebetween, wherein the first and second scanning optical systems guide the first and second laser beams which have been deflected for scanning by the deflection scanning device, to corresponding surfaces to be scanned respectively, wherein each of the first and second scanning optical systems includes a scanning lens arranged in a downstream side of an optical path of the deflection scanning device, and a polarization beam splitter arranged in a downstream side of an optical path of the scanning lens, wherein the first scanning optical system includes a half-wave plate arranged in the downstream side of the optical path of the scanning lens and in an upstream side of an optical path of the polarization beam splitter wherein the first laser beam and the second laser beam before being incident on the first and second scanning optical systems have different phases by 180 degrees from each other.

A further purpose of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The mode for carrying out the present invention will be illustratively described in detail below based on embodiments with reference to the drawings. However, the dimensions, materials, shapes, relative arrangements and the like of the components which will be described in the following embodiments can be appropriately changed according to the structure and various conditions of the device to which the present invention is applied. In other words, the mode is not intended to limit the scope of the present invention to the following embodiments.

Figure 1:
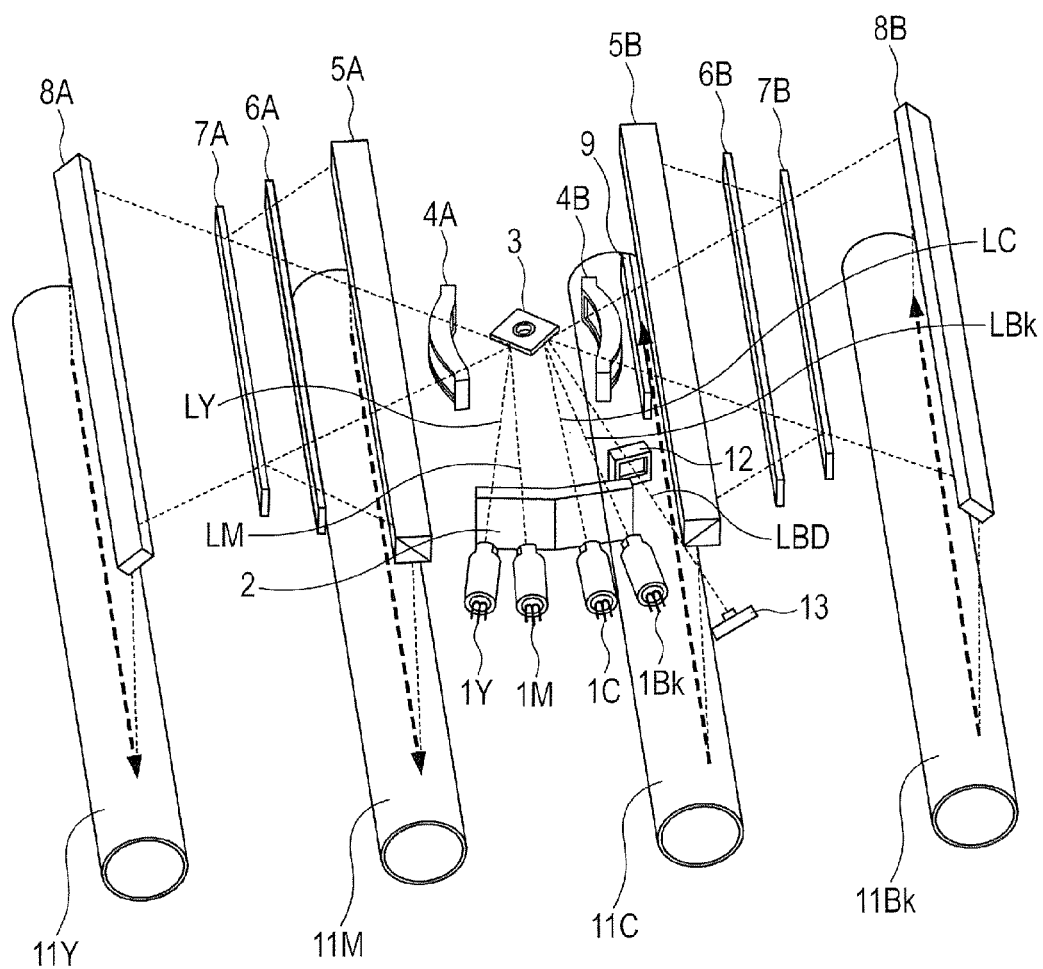
FIG. 1 is a perspective view illustrating a structure of a deflection scanner according to Embodiment 1 of the present invention.

FIG. 1 is a perspective view illustrating a structure of a deflection scanner according to Embodiment 1 of the present invention.

The deflection scanner is a device which is used in an image forming apparatus such as a laser beam printer and a digital copying machine, and is structured so as to deflect light beams (laser light) for scanning, which have been optically modulated on the basis of image information, and irradiate the surface of a photosensitive member (photosensitive drum), which is a surface to be scanned, with the optically modulated light beam. The surface of the electrostatically charged photosensitive member is irradiated with the light beam emitted from the deflection scanner, and thereby an electrostatic latent image is formed on the surface of the photosensitive member. Toners for each color are imparted to the electrostatic latent images from a developing device, and thereby the electrostatic latent image on the surface of the photosensitive member is visualized as a toner image. The toner images of each color are collectively transferred onto an intermediate transfer member or a transfer material, and are overlaid to form a single image. Thereby, the color image is formed.

In the deflection scanner according to the present embodiment, light beams each corresponding to image information of four colors of yellow (Y), magenta (M), cyan (C) and black (Bk) are emitted from semiconductor lasers 1Y, 1M, 1C and 1Bk which are light sources. The light beams, which have been emitted from the semiconductor lasers 1Y, 1M, 1C and 1Bk, are converted into approximately parallel light by a collimate lens (not shown), and linearly irradiate the reflecting surface (deflecting surface) of a polygon mirror 3 which is a deflector (deflection scanning device) by a cylindrical lens 2.

The semiconductor lasers 1Y, 1M, 1C and 1Bk are arranged approximately on the same plane perpendicular to a rotary shaft of the polygon mirror 3. A wavelength and a polarization state of the light beams, which are emitted from each of the semiconductor lasers, will be described below. Specifically, the semiconductor laser 1Y is P polarized light with a wavelength of 650 nm, the semiconductor laser 1M is P polarized light with a wavelength of 780 nm, the semiconductor laser 1C is S polarized light with a wavelength of 780 nm, and the semiconductor laser 1Bk is S polarized light with a wavelength of 650 nm. In other words, the semiconductor lasers 1Y and 1M and the semiconductor lasers 1C and 1Bk have different deflection directions (phase) from each other by n (180 degrees).

The cylindrical lens 2 is integrally molded of a resin, and the optical axes of each lens are arranged so as to slightly tilt against each of the other light beams in order to avoid the influence of returned light from a lens.

Light beams LY, LM, LC and LBk are emitted from the semiconductor lasers 1Y, 1M, 1C and 1Bk, respectively, and the light beam LM and the light beam LY, and the light beam LBk and the light beam LC are incident on the respective same reflecting surfaces of the polygon mirror, and are reflected and deflected in directions opposite to each other. Here, a side in which the light beam LM and the light beam LY are deflected for scanning is referred to as a first optical system (first scanning optical system), and a side in which the light beam LBk and the light beam LC are deflected for scanning is referred to as a second optical system (second scanning optical system). The light beams LY, LM, LC and LB irradiate corresponding surfaces to be scanned through different optical paths from each other. Thus, the first optical system and the second optical system are arranged in the downstream sides of the optical paths of the polygon mirror 3, respectively.

The polygon mirror 3 is rotated at a constant speed with a motor (not shown), and deflects each of the light beams for scanning. The scanning lenses 4A and 4B are arranged symmetrically with respect to the polygon mirror 3 of the center, and form images on photosensitive member drums 11Y, 11M, 11C and 11Bk that are surfaces to be scanned, by using the light beams, which have been deflected for scanning by the polygon mirror 3. The deflection scanner thus scans the photosensitive member drums at a constant speed.

In the first optical system, a polarization beam splitter 5A, a quarter-wave plate 6A, a dichroic mirror 7A and a mirror 8A are arranged along a direction of the light beams to be emitted (from upstream side of optical path toward downstream side thereof), behind the scanning lens 4A (in downstream side of optical path), which is the first scanning lens. In the second optical system, a half-wave plate 9, a polarization beam splitter 5B, a quarter-wave plate 6B, a dichroic mirror 7B and a mirror 8B are arranged from the upstream of the optical path toward the downstream thereof in this order, behind the scanning lens 4B (in downstream side of optical path), which is the second scanning lens.

Here, the polarization beam splitters 5A and 5B are first optical elements which pass the light beams therethrough or reflect the light beams thereon according to the polarization state of the incident light beams, and in the present embodiment, the polarization beam splitters are structured so as to pass the P polarized light therethrough and reflect the S polarized light thereon. In addition, the polarization beam splitter is structured so that when the polarization beam splitter reflects the S polarized light thereon, the reflection direction varies depending on the incident direction of the light beam. The quarter-wave plates 6A and 6B which are the second optical elements that change polarization state of the incident light beams rotate the polarization direction (phase) of the incident light beam by $\pi/2$ (90 degrees), and pass the rotated light beam therethrough. The dichroic mirrors 7A and 7B are third optical elements which pass the light beam having a certain wavelength band therethrough, and reflect the light beam having a certain wavelength band thereon, and in the present embodiment, are mirrors which pass the light beam having a wavelength of 650 nm therethrough and reflect the light beam having a wavelength of 780 nm thereon. The half-wave plate 9 is a fourth optical element which rotates the polarization direction (phase) of the incident light beam by $\pi$, and passes the rotated light beam therethrough. A difference between the first optical system and the second optical system is the presence or absence of the half-wave plate 9.

In addition, the deflection scanner has such a structure that the light beam LBD passes through a synchronization lens 12 and is incident on a synchronization detecting sensor 13, in order to set the light beam which has not pass through the scanning lens 4B out of the light beam LBk as a reference of the writing position. The writing positions of each of the light beams are determined with reference to the light beam LBD which is incident on this synchronization detecting sensor 13. In the present embodiment, the synchronization lens 12 and the synchronization detecting sensor 13 are provided in the same side as that of the second optical system, but may also be provided in the same side as that of the first optical system.

Figure 2:
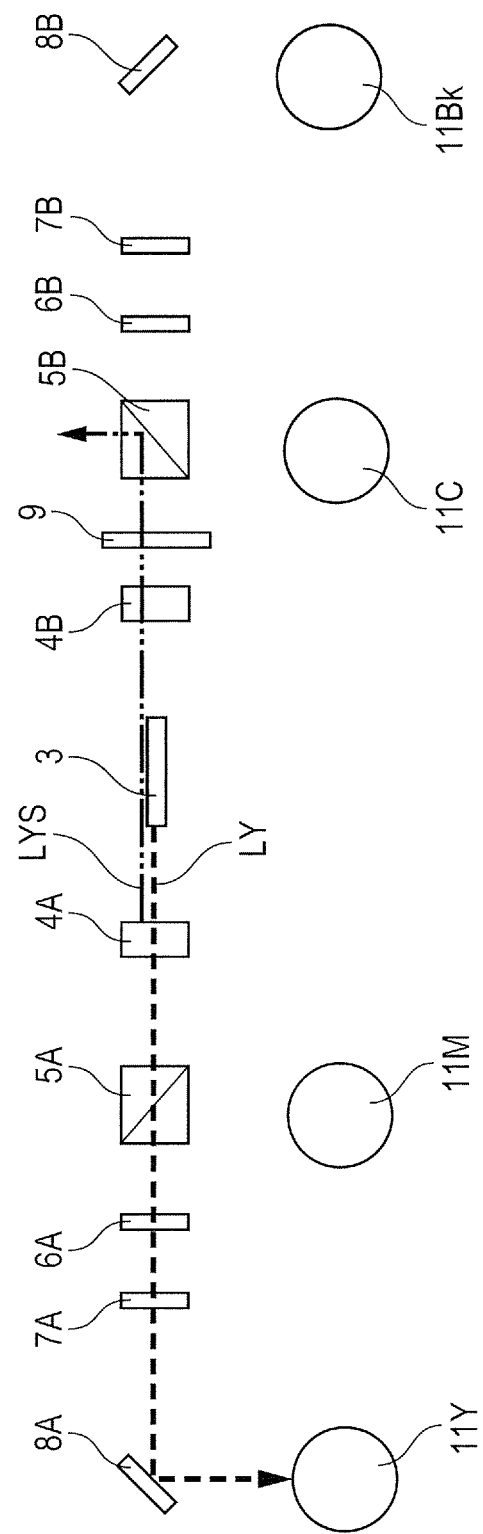
FIG. 2 is a schematic sectional view illustrating an operation principle of removing first stray light.
Figure 3:
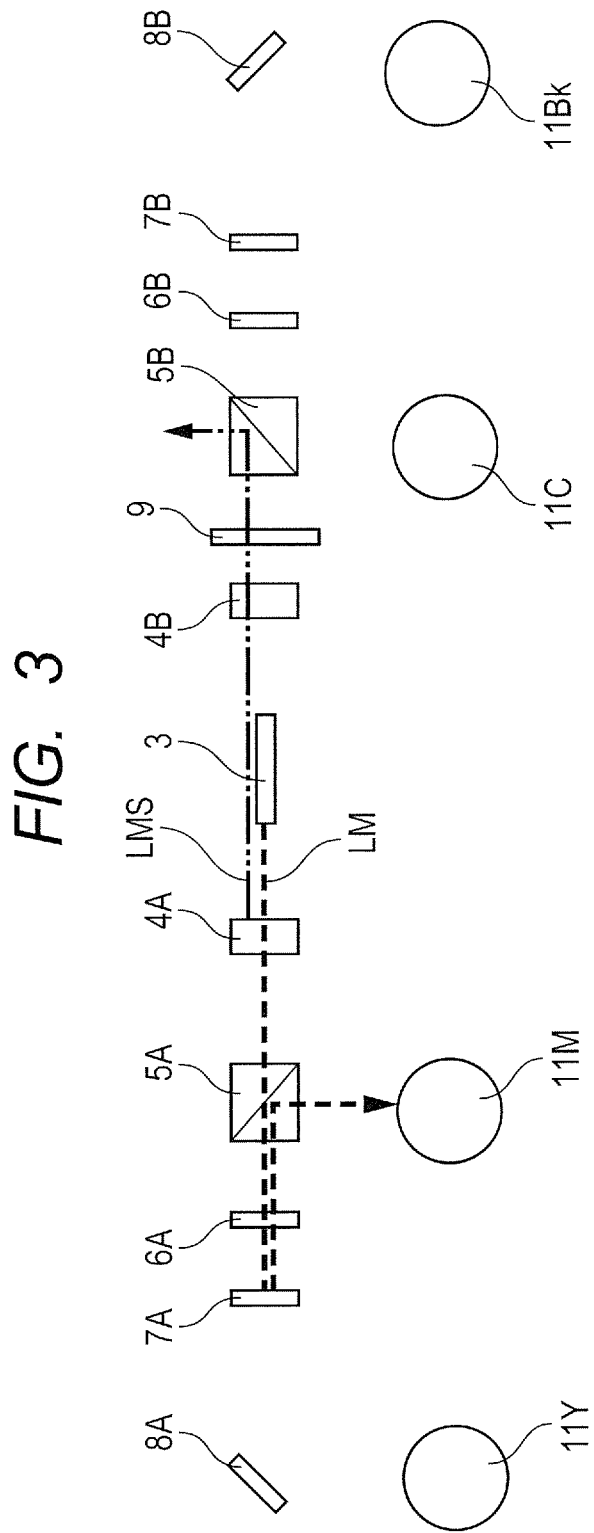
FIG. 3 is a schematic sectional view illustrating an operation principle of removing second stray light.
Figure 4:
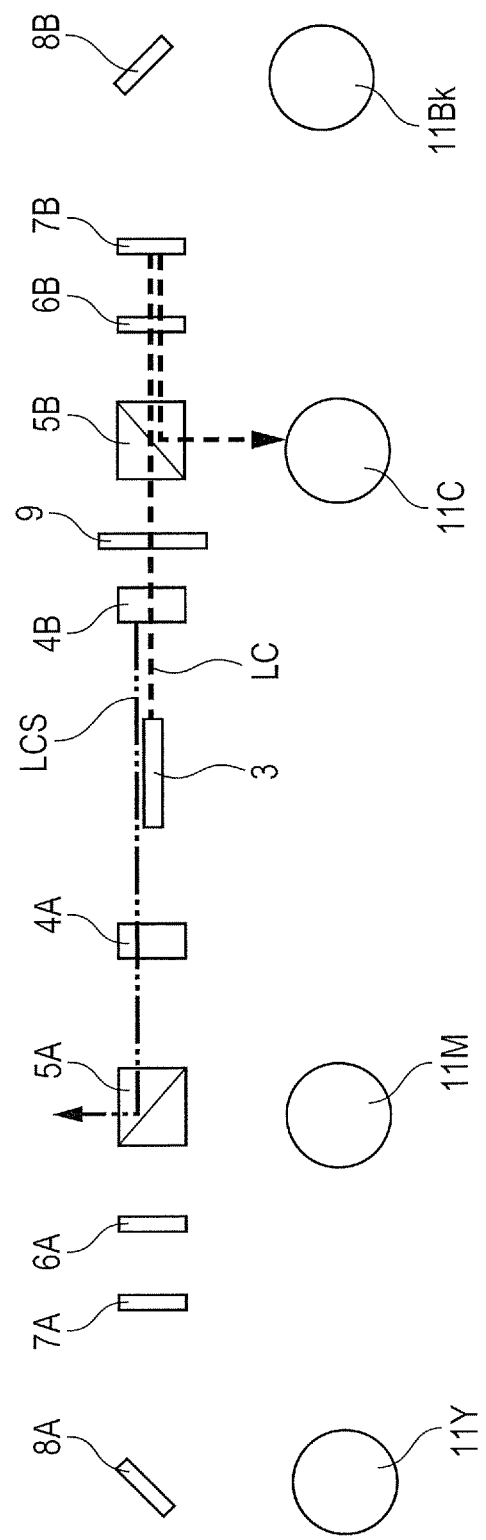
FIG. 4 is a schematic sectional view illustrating an operation principle of removing third stray light.
Figure 5:
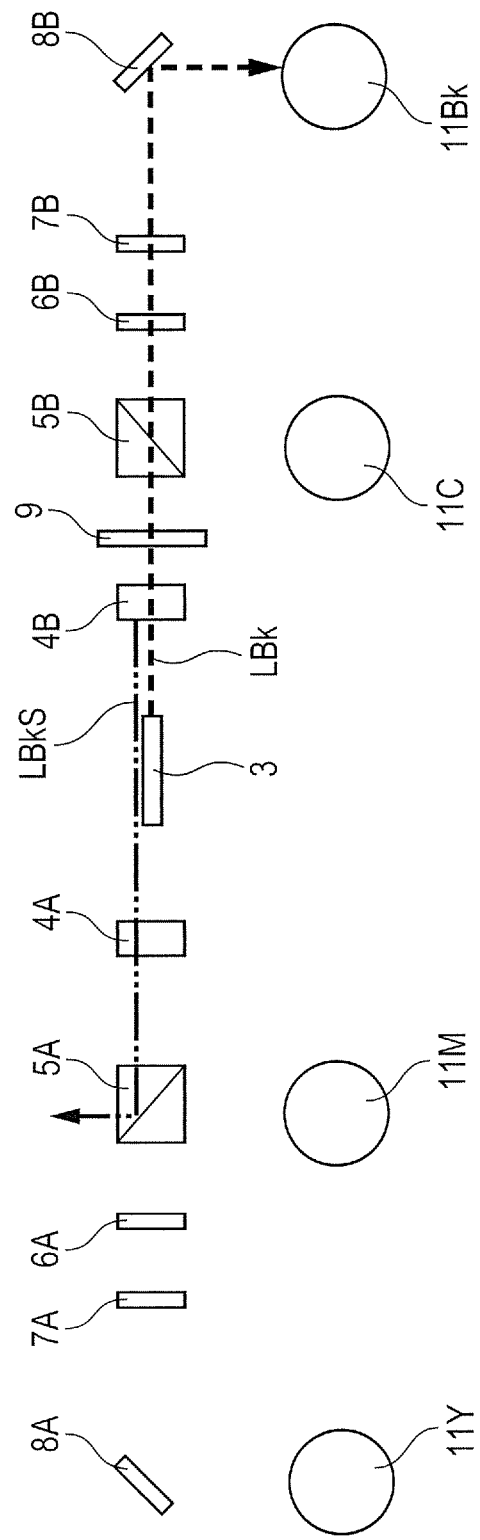
FIG. 5 is a schematic sectional view illustrating an operation principle of removing fourth stray light.

The operation principles of a deflection scanner will be described below with reference to FIG. 2 to FIG. 5. FIG. 2 is a schematic sectional view illustrating an operation principle of removing first stray light. FIG. 3 is a schematic sectional view illustrating an operation principle of removing second stray light. FIG. 4 is a schematic sectional view illustrating an operation principle of removing third stray light. FIG. 5 is a schematic sectional view illustrating an operation principle of removing fourth stray light.

FIG. 2 illustrates a state in which first stray light LYS out of a light beam LY, which has been reflected on the lens surface of the scanning lens 4A, is removed by the polarization beam splitter 5B. The light beam LY is shown by a dashed line, and the stray light LYS is shown by a chain double-dashed line.

Firstly, the light beam LY which has been incident on the polygon mirror 3 is P polarized light with a wavelength of 650 nm, accordingly passes through the scanning lens 4A, and passes also through the polarization beam splitter 5A, in the state.

The light beam LY which has been the P polarized light is converted into circular polarized light in the quarter-wave plate 6A. The light beam which has been converted into the circular polarized light passes through the dichroic mirror 7A which passes the light beam with a wavelength of 650 nm therethrough, and irradiates the photosensitive member drum 11Y by the mirror 8A.

On the other hand, the stray light LYS is reflected on the lens surface of the scanning lens 4A. In this figure, the light beam LY and the stray light LYS are drawn as if to pass through paths having different heights, but the paths are drawn for the sake of description, and actually the lights pass through paths having the same height. The stray light LYS which has been reflected by the scanning lens 4A passes through the side of the polygon mirror 3, passes through the scanning lens 4B, and is converted into the S polarized light by the half-wave plate 9. The S polarized light is reflected by the polarization beam splitter 5B. The polarization beam splitter 5B reflects the S polarized light which is incident from the half-wave plate 9 side, toward a direction of deviating from the second optical system and also of not being incident on the first optical system again. In addition, the polarization beam splitter 5B reflects the S polarized light which is incident from the quarter-wave plate 6B side, toward a direction of being incident on the photosensitive member drum 11C, which will be described later (see FIG. 4). Accordingly, the surfaces of the photosensitive member drum 11C and the photosensitive member drum 11Bk shall not be irradiated with the stray light LYS.

FIG. 3 illustrates a state in which second stray light LMS out of a light beam LM, which has been reflected on the lens surface of the scanning lens 4A, is removed by the polarization beam splitter 5B. The light beam LM is shown by a dashed line, and the stray light LMS is shown by a chain double-dashed line.

Firstly, the light beam LM which has been incident on the polygon mirror 3 is P polarized light with a wavelength of 780 nm, accordingly passes through the scanning lens 4A, and passes also through the polarization beam splitter 5A, in the state.

The light beam LM which has been the P polarized light is converted into circular polarized light in the quarter-wave plate 6A. The light beam which has been converted into the circular polarized light is reflected by the dichroic mirror 7A which reflects the light beam with a wavelength of 780 nm thereon, is incident on the quarter-wave plate 6A again, and is converted into the S polarized light. The S polarized light is reflected by the polarization beam splitter 5A, and irradiates the photosensitive member drum 11M.

On the other hand, the stray light LMS is reflected on the lens surface of the scanning lens 4A, passes through the scanning lens 4B, and is converted into the S polarized light by the half-wave plate 9. The S polarized light is reflected by the polarization beam splitter 5B toward a direction of deviating from the first optical system and the second optical system, and accordingly shall not irradiate the photosensitive member drum 11C and the photosensitive member drum 11Bk. In this figure as well, the light beam LM and the stray light LMS are drawn as if to pass through paths having different heights, similarly to FIG. 2, but the paths are drawn for the sake of description, and actually the lights pass through paths having the same height.

FIG. 4 illustrates a state in which third stray light LCS out of light beam LC, which has been reflected on the lens surface of the scanning lens 4B, is removed by the polarization beam splitter 5A. The light beam LC is shown by a dashed line, and the stray light LCS is shown by a chain double-dashed line.

Firstly, the light beam LC which has been incident on the polygon mirror 3 is S polarized light with a wavelength of 780 nm, accordingly passes through the scanning lens 4B, is converted into the P polarized light by the half-wave plate 9, and passes through the polarization beam splitter 5B.

The light beam which has been the P polarized light is converted into circular polarized light in the quarter-wave plate 6B. The light beam which has been converted into the circular polarized light is reflected by the dichroic mirror 7B which reflects the light beam with a wavelength of 780 nm thereon, is incident on the quarter-wave plate 6B again, and is converted into the S polarized light. The S polarized light is reflected by the polarization beam splitter 5B, and irradiates the photosensitive member drum 11C.

On the other hand, the stray light LCS is reflected on the lens surface of the scanning lens 4B, and passes through the scanning lens 4A. The S polarized light which is incident from the scanning lens 4A side is reflected toward a direction of deviating from the first optical system and the second optical system by the polarization beam splitter 5A, and accordingly shall not irradiate the photosensitive member drum 11Y and the photosensitive member drum 11M. In this figure as well, the light beam LC and the stray light LCS are drawn as if to pass through paths having different heights, similarly to FIG. 2, but the paths are drawn for the sake of description, and actually the lights pass through paths having the same height.

FIG. 5 illustrates a state in which fourth stray light LBkS out of a light beam LBk, which has been reflected on the lens surface of the scanning lens 4B, is removed by the polarization beam splitter 5A. The light beam LBk is shown by a dashed line, and the stray light LBkS is shown by a chain double-dashed line.

Firstly, the light beam LBk which has been incident on the polygon mirror 3 is S polarized light with a wavelength of 650 nm, and accordingly passes through the scanning lens 4B, is converted into the P polarized light by the half-wave plate 9, and passes through the polarization beam splitter 5B.

The light beam LBk which has been the P polarized light is converted into circular polarized light in the quarter-wave plate 6B. The light beam which has been converted into the circular polarized light passes through the dichroic mirror 7B which passes the light beam with a wavelength of 650 nm therethrough, is reflected by the mirror 8B, and irradiates the photosensitive member drum 11Bk.

On the other hand, the stray light LBkS is reflected on the lens surface of the scanning lens 4B, and passes through the scanning lens 4A. The S polarized light is reflected by the polarization beam splitter 5A toward a direction of deviating from the first optical system and the second optical system, and accordingly shall not irradiate the photosensitive member drum 11Y and the photosensitive member drum 11M. In this figure as well, the light beam LBk and the stray light LBkS are drawn as if to pass through paths having different heights, similarly to FIG. 2, but the paths are drawn for the sake of description, and actually the lights pass through paths having the same height.

As has been described above, according to the present embodiment, the stray light which has been reflected by the scanning lens 4A of the first optical system and has been incident on the second optical system is reflected toward an opposite direction to the surface to be scanned by the polarization beam splitter 5B of the second optical system. In addition, the stray light which has been reflected by the scanning lens 4B of the second optical system and has been incident on the first optical system is reflected toward an opposite direction to the surface to be scanned by the polarization beam splitter 5A of the first optical system. Accordingly, the deflection scanner can prevent the stray light which has been reflected on the lens surface of one scanning lens out of the scanning lenses arranged so as to form a pair with respect to the polygon mirror of the center, from being incident on the other scanning lens and reaching an image surface. Thus, the deflection scanner according to the present embodiment suppresses an action that the light beam which has been reflected on the lens surface of the scanning lens is guided to the surface to be scanned, and thereby the deflection scanner to be used, for instance, in a color image forming apparatus, can suppress an image failure due to the influence of the stray light and can provide an adequate image.

In addition, the deflection scanner according to the present embodiment can properly separates light beams having different polarization states from each other by using the polarization beam splitter as the first optical element. In addition, the deflection scanner can properly change the polarization states of the light beams, by using the quarter-wave plate as the second optical element and using the half-wave plate as the fourth optical element. In addition, the deflection scanner can properly separate light beams having different wavelengths from each other, by using the dichroic mirror as the third optical element.

In addition, according to the present embodiment, the polarization states of a light beam which is incident on the first optical system and a light beam which is incident on the second optical system are both linearly polarized light, and one light beam is P polarized light and the other is S polarized light. Accordingly, the deflection scanner can properly separate stray light which has been reflected on the scanning lens 4A of the first optical system and has been incident on the second optical system, from the light beam which has been incident on the second optical system directly from a light source. Similarly, the deflection scanner can also properly separate stray light which has been reflected on the scanning lens 4B of the second optical system and has been incident on the first optical system, from the light beam which has been incident on the first optical system directly from the light source.

Incidentally, in the present embodiment, it has been described that the first stray light LYS and the second stray light LMS are generated by the reflection of parts of the respective light beams LY and LM on the scanning lens 4A. However, a similar effect can be obtained even when the first stray light LYS and the second stray light LMS are generated by the reflection of the light beams on other portions than the scanning lens 4A of the first optical system.

Incidentally, in the present embodiment, it has been described that the third stray light LCS and the fourth stray light LBkS are generated by the reflection of parts of the respective light beams LC and LBk on the scanning lens 4B. However, a similar effect can be obtained even when the third stray light LCS and the fourth stray light LBkS are generated by the reflection of the light beams on other portions than the scanning lens 4B of the first optical system.

In addition, in the present embodiment, both of the first optical system and the second optical system have been optical systems which guide the light beam onto the surface to be scanned by using the polarization beam splitter. However, as long as the polarization directions (phases) of the light beams which are swept in the opposite direction to each other across the polygon mirror 3 are different by π (180 degrees) from each other, only one optical system may be the optical system which guides the light beam onto the surface to be scanned by the polarization beam splitter, as has been described in the present embodiment. In other words, at least one side may be an optical system using the polarization beam splitter 5A, or an optical system using the polarization beam splitter 5B and the half-wave plate 9. Thus, as long as at least one side is the above described optical system, the deflection scanner shows an effect of suppressing the action that the stray light coming from another optical system existing in the opposite side across the polygon mirror 3 is incident on the optical system as described above and results in being incident on the surface to be scanned.

Embodiment 2

Figure 6:
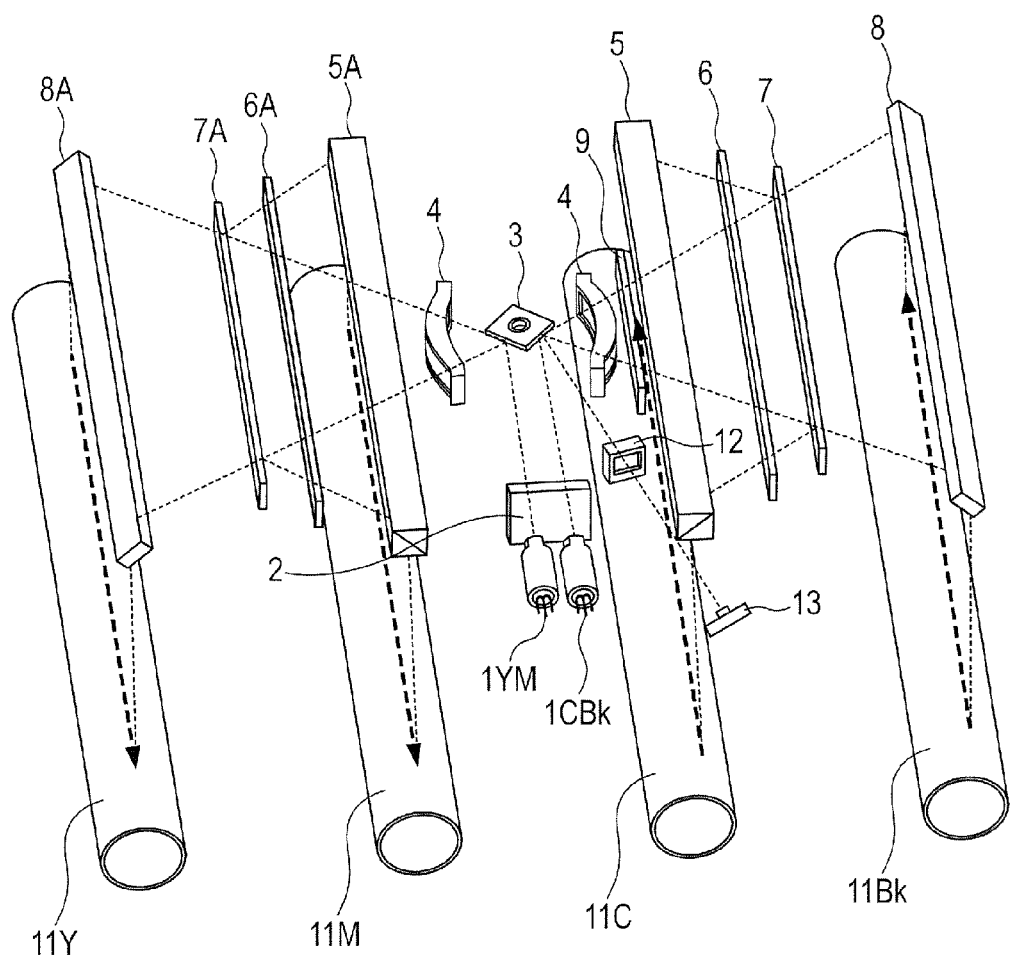
FIG. 6 is a perspective view illustrating a structure of a deflection scanner according to Embodiment 2 of the present invention.

FIG. 6 is a perspective view illustrating a structure of a deflection scanner according to Embodiment 2.

The structure from a light source to a polygon mirror in the present embodiment is different from that in embodiment 1, and the structure from the polygon mirror to photosensitive member drums is the same as that in Embodiment 1. In other words, the structure has a first optical system and a second optical system arranged so as to face each other with the polygon mirror therebetween.

Semiconductor lasers 1YM and 1CBk which are light sources are semiconductor lasers, respectively, which can emit two types of semiconductor lasers having different wavelengths from one package. One of the respective semiconductor lasers emits a laser beam with a wavelength of 650 nm, and the other emits a laser beam with a wavelength of 780 nm. Both of the laser beams with a wavelength of 650 nm and a wavelength of 780 nm are linearly polarized light, and the polarization directions coincide with each other.

A light beam LY and a light beam LM are emitted from the semiconductor laser 1YM. The light beam LY is a light beam which is P polarized light with a wavelength of 650 nm, and the light beam LM is a light beam which is the P polarized light with a wavelength of 780 nm. In addition, a light beam LC and a light beam LBk are emitted from the semiconductor laser 1CBk. The light beam LC is a light beam which is S polarized light with a wavelength of 780 nm, and the light beam LBk is a light beam which is the S polarized light with a wavelength of 650 nm.

The semiconductor lasers 1YM and 1CBk are arranged approximately on the same plane perpendicular to a rotary shaft of a polygon mirror 3, and the light beams LY, LM, LC and LBk also pass through approximately the same plane.

The light beams, which have been emitted from the semiconductor lasers 1YM and 1CBk, are converted into approximately parallel light by a collimate lens (not shown), and irradiate the reflecting surface of the polygon mirror 3 so as to become linear thereon due to the cylindrical lens 2. The light beam LM and the light beam LY, and the light beam LBk and the light beam LC are incident on the same reflecting surface of the polygon mirror, respectively, and are reflected in directions opposite to each other.

The scanning lenses 4A and 4B make the light beams, which have been deflected for scanning by the polygon mirror 3, form images on the photosensitive member drums 11Y, 11M, 11C and 11Bk, and make the polygon mirror 3 scan the light beams at a constant speed.

On a side in which the light beam LM and the light beam LY are swept, a polarization beam splitter 5A, a quarter-wave plate 6A, a dichroic mirror 7A and a mirror 8A are arranged behind the scanning lens 4A. In a side in which the light beam LBk and the light beam LC are swept, a half-wave plate 9, a polarization beam splitter 5B, a quarter-wave plate 6B, a dichroic mirror 7B and a mirror 8B are arranged behind the scanning lens 4B.

Here, the polarization beam splitters 5A and 5B are mirrors which are structured so as to pass P polarized light therethrough and reflect S polarized light thereon, and the dichroic mirrors 7A and 7B are mirrors which are structured so as to pass the light beam with a wavelength of 650 nm therethrough and reflect the light beam with a wavelength of 780 nm thereon.

In addition, the deflection scanner has such a structure that the light beam LBD passes through a synchronization lens 12 and is incident on a synchronization detecting sensor 13, in order to set the light beam which has not pass through the scanning lens 4B out of the light beam LBk as the reference of the writing position.

Each of the light beams LY, LM, LC and LBk are reflected by the scanning lenses 4A and 4B to generate stray lights, but these stray lights are removed by the principle similar to that in Embodiment 1 (see FIG. 2 to FIG. 5).

As has been described above, the deflection scanner according to the present embodiment can properly separate the stray light which has been reflected on the scanning lens 4A of the first optical system and has been incident on the second optical system, from the light beam which has been directly incident on the second optical system from a light source, in a similar way to Embodiment 1. Similarly, the deflection scanner can also properly separate the stray light which has been reflected on the scanning lens 4B of the second optical system and has been incident on the first optical system, from the light beam which has been directly incident on the first optical system from the light source.

The present embodiment has peculiarity in the structure of the semiconductor lasers, compared to the Embodiment 1. The semiconductor laser of the present embodiment is suitable for being further compactly manufactured due to the complexation of semiconductor lasers. The polarization direction is determined by the direction in which a chip (not shown) in the inside of the semiconductor laser is packaged, and the wavelength is determined by the composition of the chip. Because of these, as for the complexation of the semiconductor laser, it is easier in manufacture to integrate semiconductor lasers having different wavelengths into one package in which the semiconductor lasers have the same polarization direction, than to integrate semiconductor lasers having the same wavelengths and different polarization directions into one package.

Specifically, the deflection scanner of the present invention is structured so that a plurality of light beams which are deflected for scanning in each of the first optical system and the second optical system have the same polarization state and the different wavelengths from each other, respectively. Accordingly, such a deflection scanner as in the present embodiment more easily complexes light sources in each of the optical systems, in other words, the semiconductor lasers, and can be easily further compacted, as described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-189536, filed Aug. 31, 2011, and Japanese Patent Application No. 2012-182406, filed Aug. 21, 2012, which are hereby incorporated by reference herein in their entirety.

What is claimed is:

1. An optical scanning apparatus comprising:
    first and second light sources which emit first and second laser lights, respectively;
    a deflection scanning device for deflecting the first and second laser lights for scanning; and
    first and second scanning optical systems which are provided on opposite sides with regard to the deflection scanning device,
    wherein the first and second scanning optical systems guide the first and second laser beams which have been deflected for scanning by the deflection scanning device, to corresponding surfaces to be scanned, respectively,
    wherein each of the first and second scanning optical systems comprises a scanning lens arranged in a downstream side of an optical path of the deflection scanning device, and a polarization beam splitter arranged in a downstream side of an optical path of the scanning lens,
    wherein the first scanning optical system comprises a half-wave plate arranged in the downstream side of the optical path of the scanning lens and in an upstream side of an optical path of the polarization beam splitter, and
    wherein the first laser beam and the second laser beam before being incident on the first and second scanning optical systems have different phases by 180 degrees from each other.

2. An optical scanning apparatus according to claim 1, further comprising:
    a third light source which emits a third laser beam,
    wherein the third laser beam is deflected for scanning by the deflection scanning device, and swept on a corresponding surface to be scanned by the first scanning optical system,
    wherein the first scanning optical system comprises a dichroic mirror in a downstream side of the optical path of the polarization beam splitter,
    wherein the first laser beam and the third laser beam have different wavelengths, and the first laser beam and the third laser beam are guided onto corresponding surfaces to be scanned, respectively, by the dichroic mirror.

3. An optical scanning apparatus according to claim 2, wherein the first scanning optical system comprises a quarter-wave plate in the downstream side of the optical path of the polarization beam splitter,
    wherein the first laser beam passes through the quarter-wave plate, then is reflected by the dichroic mirror, passes through the quarter-wave plate again, passes through the polarization beam splitter and is guided to a corresponding surface to be scanned, and the third laser beam passes through the quarter-wave plate, then passes through the dichroic mirror and is guided to a corresponding surface to be scanned without passing through the quarter-wave plate and the polarization beam splitter again.

4. An image forming apparatus comprising:
    an optical scanning apparatus according to claim 2; and
    a plurality of photosensitive members that forms an image on a recording material,
    wherein the first and third laser beams scan different photosensitive members.

5. An optical scanning apparatus according to claim 1, wherein the deflection scanning device is a rotating polygon mirror.

6. An image forming apparatus comprising:
    an optical scanning apparatus according to claim 1; and
    a plurality of photosensitive members that forms an image on a recording material, wherein the first and second laser beams scan different photosensitive members.

7. An image forming apparatus according to claim 6, wherein the image forming apparatus forms images with different colors on the plurality of the photosensitive members and forms images with a plurality of colors on the recording material.

8. An optical scanning apparatus comprising:
- first and second light sources which emit first and second laser beams, respectively;
- a deflection scanning device for deflecting the first and second laser beams for scanning; and
- first and second scanning optical systems which are provided on opposite sides with regard to the deflection scanning device,
- wherein the first and second scanning optical systems guide the first and second laser beams which have been deflected for scanning by the deflection scanning device, to corresponding surfaces to be scanned, respectively,
- wherein the first scanning optical system comprises a scanning lens arranged in a downstream side of an optical path of the deflection scanning device, a half-wave plate arranged in a downstream side of an optical path of the scanning lens and a polarization beam splitter arranged in a downstream side of an optical path of the half-wave plate,
- wherein the first laser beam and the second laser beam before being incident on the first and second scanning optical systems have different phases by 180 degrees from each other.

9. An optical scanning apparatus according to claim 8, wherein the second scanning optical system comprises the scanning lens arranged in the downstream side of the optical path of the deflection scanning device.

* * * * *